United States Patent
Brown et al.

(10) Patent No.: US 10,051,251 B2
(45) Date of Patent: *Aug. 14, 2018

(54) VIDEO PROJECTOR WITH AUTOMATED IMAGE ENHANCEMENT

(71) Applicant: International Business Machines Corporation, Armonk, NY (US)

(72) Inventors: Douglas S. Brown, Charlotte, NC (US); John F. Kelley, Clarkesville, GA (US); Kristin S. Moore, Charleston, SC (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/071,590

(22) Filed: Mar. 16, 2016

(65) Prior Publication Data

US 2016/0198136 A1 Jul. 7, 2016

Related U.S. Application Data

(63) Continuation of application No. 14/151,069, filed on Jan. 9, 2014, now Pat. No. 9,319,622.

(51) Int. Cl.
*H04N 9/31* (2006.01)
*H04N 5/74* (2006.01)

(52) U.S. Cl.
CPC ............ *H04N 9/3194* (2013.01); *H04N 5/74* (2013.01); *H04N 9/317* (2013.01); *H04N 9/3182* (2013.01); *H04N 9/3185* (2013.01)

(58) Field of Classification Search
CPC ........ G03B 21/14; G03B 21/26; G03B 21/53; H04N 9/3185; H04N 9/3194
See application file for complete search history.

(56) References Cited

U.S. PATENT DOCUMENTS

| | | |
|---|---|---|
| 6,485,147 B2 | 11/2002 | Liang |
| 7,014,323 B2 | 3/2006 | Kobayashi et al. |
| 7,384,160 B2 | 6/2008 | Matsumoto et al. |
| 7,520,620 B2 | 4/2009 | Miyasaka |
| 7,959,300 B2 | 6/2011 | Hirahara et al. |
| 8,845,110 B1 * | 9/2014 | Worley, III ............ G03B 17/54 348/135 |
| 2003/0189675 A1 | 10/2003 | Itaki |
| 2005/0024606 A1 | 2/2005 | Li et al. |
| 2006/0152682 A1 | 7/2006 | Matsuda et al. |
| 2006/0285080 A1 | 12/2006 | Kurihara |

(Continued)

OTHER PUBLICATIONS

Epson, "Epson Answers", http://knoware.epson.com, Fall 2002, 1 page.

(Continued)

*Primary Examiner* — Sultan Chowdhury
(74) *Attorney, Agent, or Firm* — Brian Restauro; Hoffman Warnick LLC (57) ABSTRACT

A system, method and program product for enhancing video content being projected by a video projector. A video projector is disclosed having a projection system for projecting video content onto a surface; a camera for capturing image data from the surface; an analysis system for analyzing captured image data; and a correction system for enhancing the video content being projected onto the surface based on the analysis of the captured image data.

20 Claims, 6 Drawing Sheets

(56) References Cited

U.S. PATENT DOCUMENTS

| | | |
|---|---|---|
| 2007/0008504 A1 | 1/2007 | Lin |
| 2008/0284987 A1 | 11/2008 | Yonezawa |
| 2010/0165168 A1 | 7/2010 | Takahashi |
| 2010/0245532 A1* | 9/2010 | Kurtz ................ G06K 9/00711 348/14.03 |
| 2011/0032365 A1* | 2/2011 | Yett .................... G02B 27/2235 348/207.1 |
| 2011/0242493 A1 | 10/2011 | Kotani |

OTHER PUBLICATIONS

Epson PowerLite 1776W WXGA 3LCD Projector—Product Information—Epson America, Inc., http://www.epson.com/cgi-bin/Store/jsp/Product.do?BV_UseBVCookie=yes &sku=V11H47602001/14/2013, 3 pages.

ProjectorCentral News—Oct. 19, 2005—NEC Unveils LT30 & LT35, http://www.projectorcentral.com/news_story_855.htm, Jan. 14, 2013, 2 pages.

RCA Indian Head test pattern.JPG—Wikipedia, the free encyclopedia, http://en.wikipedia.org/wiki/File:RCA_Indian_Head_test_pattern.JPG, Jan. 14, 2013, 4 pages.

Chowdhury. Office Action Communication for U.S. Appl. No. 14/151,069. dated Aug. 31, 2015, 14 pages.

Chowdury. Notice of Allowance and Fees Due for U.S. Appl. No. 14/151,069. dated Jan. 21, 2016, 10 pages.

\* cited by examiner

Enhancement Programs 51

Size Optimization 60
- Border Detection
- Distance Analysis

Test Pattern Analysis 62
- Keystone
- Obliqueness
- Surface issues

Projection Corrections 64
- Auto Focuser
- Tilt/Shift
- Contrast Enhancement

Lens Step Down 66
- Uneven Surface Correction

Image Correction 68
- Filter Creation
- Filter Application

Periodic Analysis 70
- Environment Changes
- Accelerometer

Troubleshooting Mode 72
- Image data generation
- Visual Cues

VIDEO PROJECTOR WITH AUTOMATED IMAGE ENHANCEMENT

BACKGROUND

1. Field of the Invention

The present invention relates to video projector image quality, and more particularly to a system and method of correcting, adjusting and enhancing images generated from a video projector.

2. Description of the Related Art

Video projectors remain an integral mechanism for presenting mixed media content for audiences in conference rooms, classrooms, etc. Often, portable or movable video projectors are utilized within the confines of a space by a presenter. Because such video projectors and/or display screens are not fixedly mounted in the given environment, the resulting video image being displayed is subject to various quality issues such as distortions, out-of-focus issues, etc.

In many instances, the presenter must manually adjust and readjust the placement and settings on the projector to create a best quality image. This often results in a less than ideal image projection. For example, if the surface on which the projector rests is not level, a tilted image may result. If the angle of the projector is too great, a keystone effect may result, e.g., in which the image is wider at the top than the bottom. Projectors are available that address some of these basic issues by including, e.g., tilt sensors and vertical keystone adjustments. However, current approaches fail to provide a comprehensive solution that automatically generates a high quality image from a portable projector without user intervention.

SUMMARY

Disclosed is a system, method and program product that provides image enhancement for use with a video projector. According to one aspect of the present invention, a video projector is disclosed, comprising: a projection system for projecting video content onto a surface; a camera for capturing image data from the surface; an analysis system for analyzing captured image data; and a correction system for enhancing the video content being projected onto the surface based on the analysis of the captured image data.

In a second aspect, a program product stored on a computer readable storage medium is disclosed, which when executed by a computer system, enhances video content projected by a video projector onto a surface, and comprises: program code for causing a test pattern to be projected by the video projector; program code for inputting capturing image data from a camera directed at the surface; program code for analyzing captured image data; and program code for enhancing the video content being projected onto the surface based on the analysis of the captured image data.

In a third aspect, a method for enhancing video content being projected by a video projector onto a surface is disclosed, comprising: projecting a test pattern onto the surface using the video projector; capturing a test pattern image using a camera directed at the surface; analyzing the test pattern image; and enhancing the video content being projected onto the surface based on the analysis of the test pattern image.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

Figure 1:
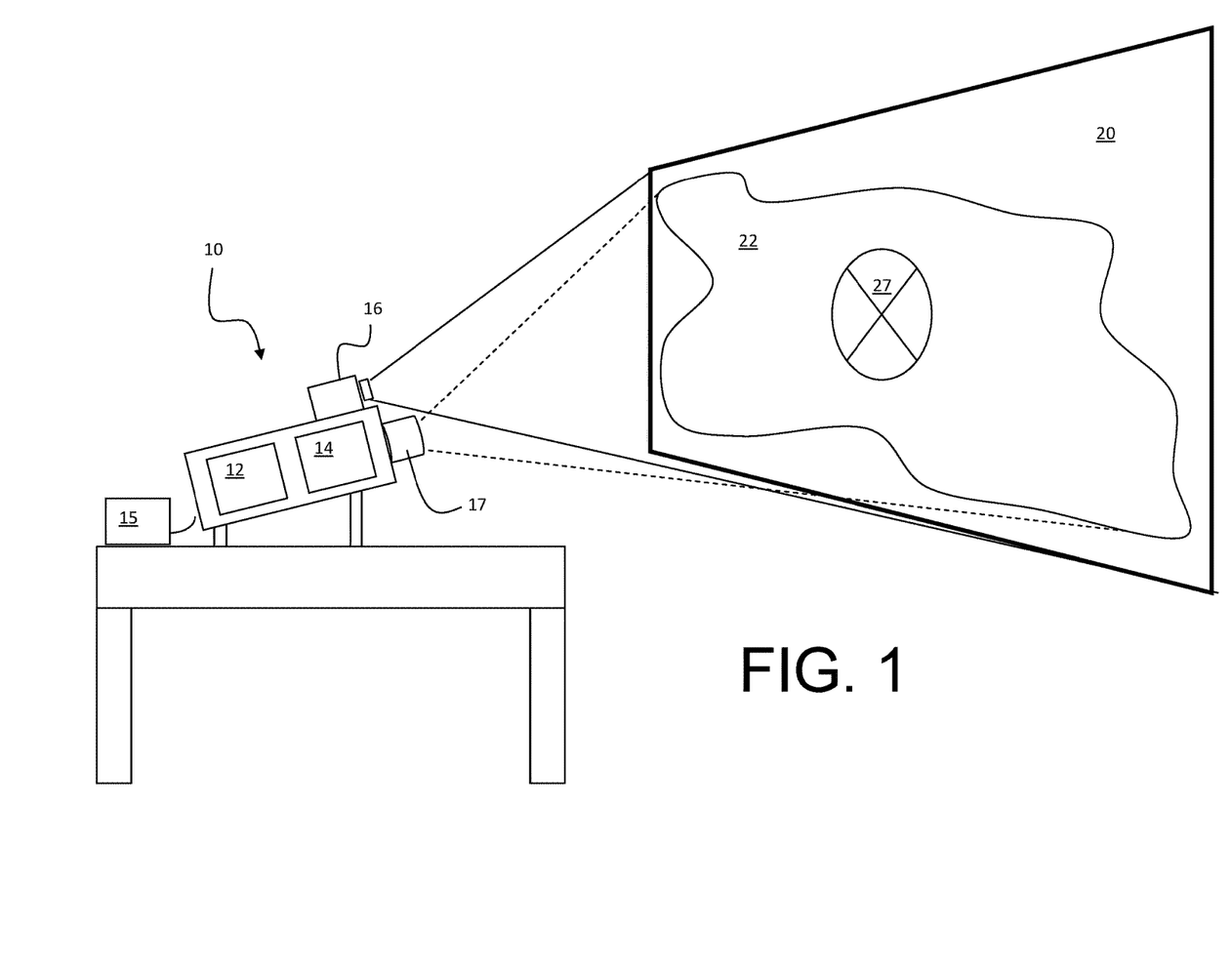
FIG. 1 depicts a video projector having an image enhancement system in accordance with embodiments of the present invention.

Described herein is an image enhancement system and method for enhancing video content being projected from a video projector. Video content may comprise any type of visual content, e.g., presentation slides, streaming video, mixed media, 3D, etc. FIG. 1 depicts an illustrative video projector 10 having an image enhancement system 12. Video projector 10 generally includes typical features found in any video projection system, e.g., an adjustable lens 17 and associated electronics and lighting capable of projecting video content 22 from a content source 15 onto a surface 20. Content source 15 may for example comprise a laptop computer, a storage device, a streaming data source, etc.

In this illustrative embodiment, video projector 10 includes: (1) a camera 16 for collecting image data associated with projected video content 22; (2) an image enhancement system 12 for collecting and analyzing image data from the camera 16; and (3) a control system 14 for controlling aspects of the video projector based on the analyzed image data. The control system 14 may effectuate physical/optical enhancements to the video projector 10 such as lens manipulations, tilting, etc., and/or digital enhancements such as digital image processing. By analyzing collected image data, numerous types of enhancements can be effectuated, which are described in further detail herein. Enhancements may be aided by the generation of a test pattern 27 onto surface 20, which can be captured by camera 16 and analyzed for image quality.

In one illustrative embodiment, camera 16 scans from an aiming point out to where the general whiteness of the surface 20 (e.g., screen or wall) turns to something else to determine the boundaries of the projectable area. This may be done using known image analysis techniques in which the color of the image is analyzed to detect a discernible change. The video projector 10 then automatically adjusts its zoom, vertical keystone, and/or horizontal keystone to most effectively fit the image at maximum zoom aligning with the top of the surface 20. Existing tilt sensor technology may be utilized to verify orientation. Keystone adjustments can either be digital (which can result in some image degradation) or optical, via an electronically managed tilt/shift lens 17.

Figure 2:
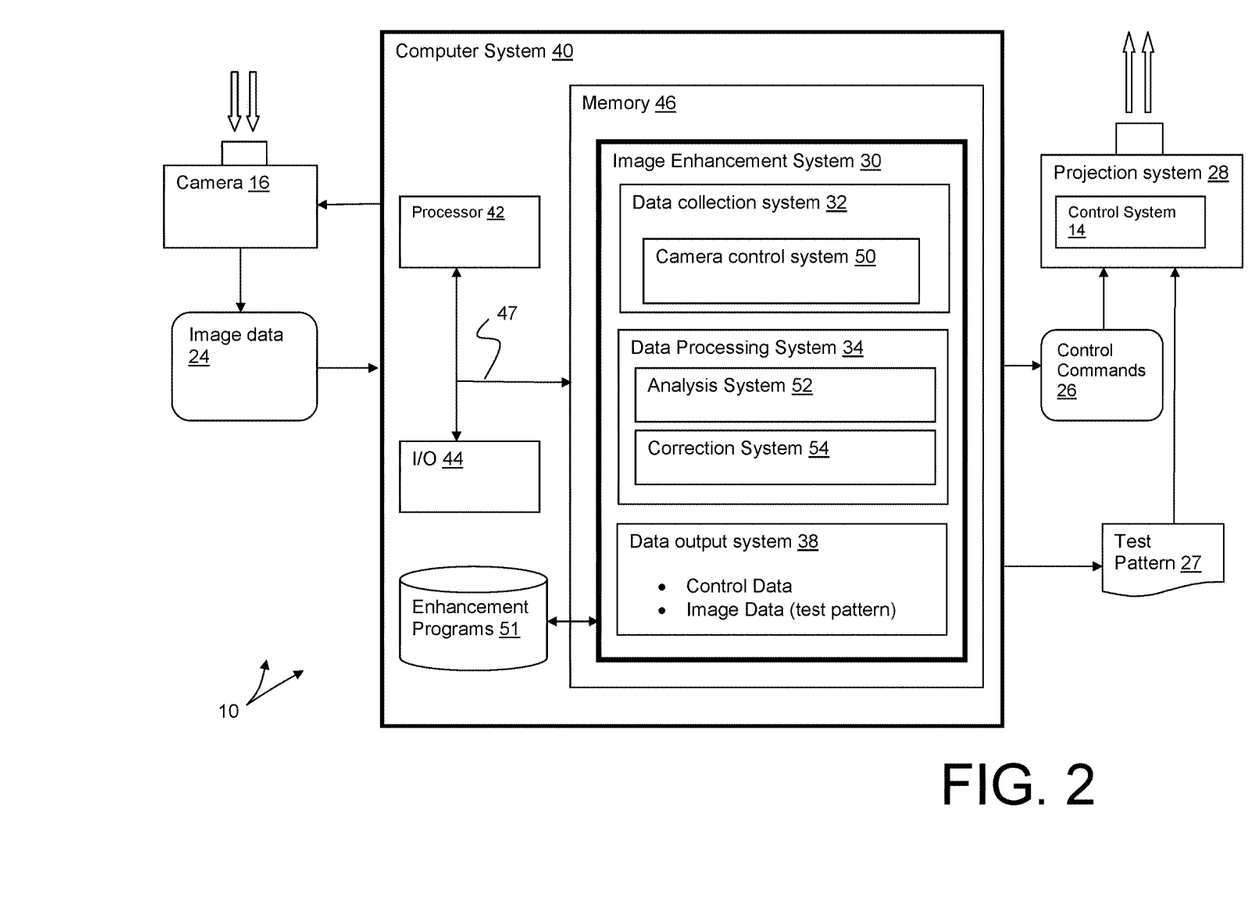
FIG. 2 depicts a computer system having an image enhancement system for controlling a video projector in accordance with embodiments of the present invention.

FIG. 2 depicts video projector 10 of FIG. 1 in which a computer system 40 is utilized to implement image enhancement system 12. As shown, image enhancement system 12 collects digital image data 24 from a camera 16 pointed at a projection surface (not shown), analyzes the image data 24 and generates control commands 26. Control commands 26 are utilized by a control system 14 to effectuate changes to a projection system 28. In this illustrative embodiment, image enhancement system 12 includes a set of enhancement programs 51 that can be employed to enhance the video projection. The enhancement programs 51 may be selectively implemented as needed, selectively implemented based on user inputs, or selected in any other manner.

In the illustrative embodiment shown, image enhancement system 12 includes: a data collection system 32, a data processing system 34 and a data output system 38; the behavior of each being dictated by the selected enhancement program 51. Data collection system 32 is utilized to collect image data 24 from camera 16, and may include a camera control system 50 for controlling the camera 16, e.g., instructing camera 16 where to aim or scan; when to turn on/off; what type of image data to capture, e.g., still, video, color, grayscale, infrared, etc. The amount and type of image data 24 collected may be determined by the particular enhancement program 51 being employed. For example, to determine the boundaries of a surface or screen, camera control system 50 may instruct the camera 16 to scan horizontally and vertically from a target point until boundaries are detected.

Data processing system 34 includes an analysis system 52 for analyzing collected image data 24 and a correction system 54 for determining an appropriate action to take when an image quality issue is detected. For example, if analysis system 52 determines that the projector image is out of focus, correction system 54 may be utilized to determine the necessary lens adjustment to correct the issue. Data output system 38 is then utilized to package and output the necessary settings into a set of control commands 26 that can be read by a control system 14 associated with projection system 28. A feedback loop may be employed to iteratively make adjustments to the projected image until a certain quality level is achieved.

In one illustrative embodiment, the enhancement program 51 causes a test pattern 27 to be projected by projection system 28 as a test pattern image (FIG. 1). The test pattern image is then captured by camera 16 and analyzed by analysis system 52. For example, the captured test pattern image can be compared with the original test pattern to identify visual distortions.

Figure 3:
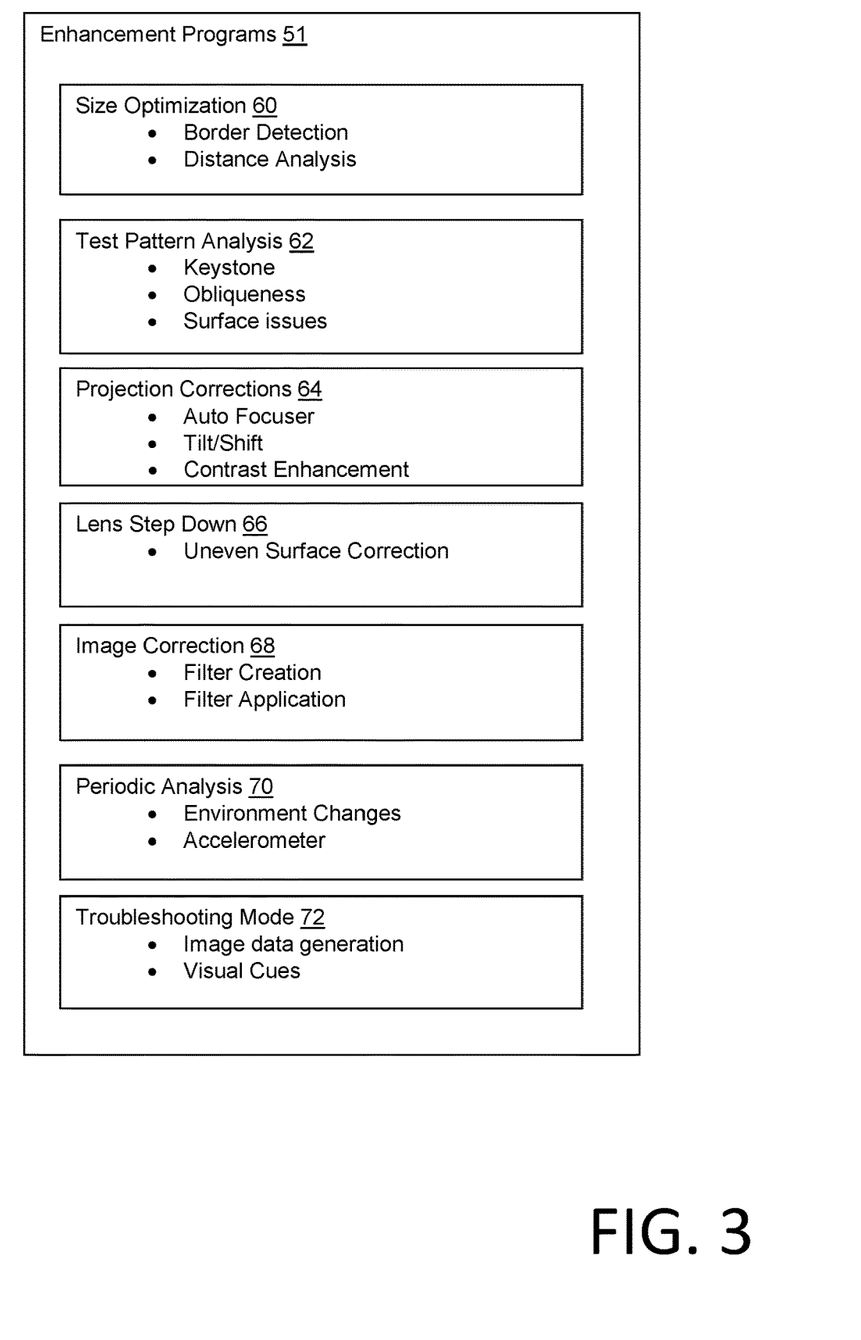
FIG. 3 depicts an illustrative set of enhancement programs in accordance with embodiments of the present invention.

FIG. 3 depicts an illustrative set of enhancement programs 51 that may be utilized individually or together to achieve enhanced video projections. It is understood that set shown and described herein is not exhaustive, and other enhancement programs may be incorporated therein.

Size optimization 60 is utilized to create an optimal sized projection area. This may be achieved with border detection as described above or distance analysis. For the case of projecting against a white wall (not a screen with discernible boundaries), the projection can be optimized to some maximum size based on a detected distance between the projector and the surface. The maximum size may be adjustable by the user or via a predefined profile. Further, the projection area size and location can be calculated so that the bottom of the image will be above some lower boundary (e.g., based on angle) so that the image does not project below the edge of the table height where no one could see it.

Figure 4:
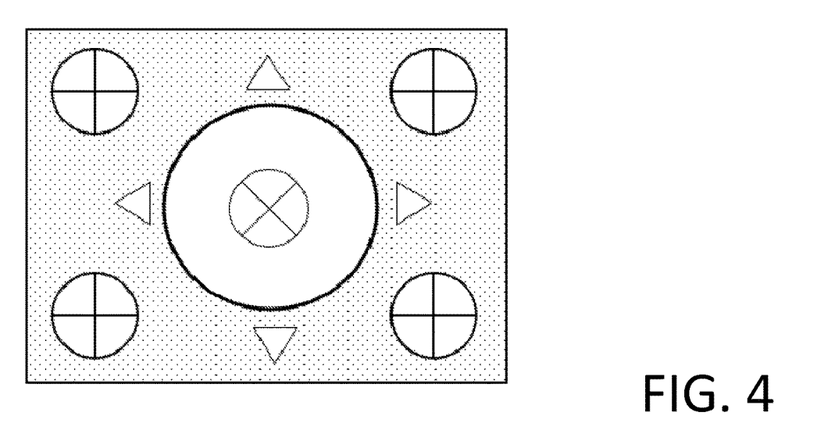
FIG. 4 depicts an illustrative test pattern.
Figure 5:
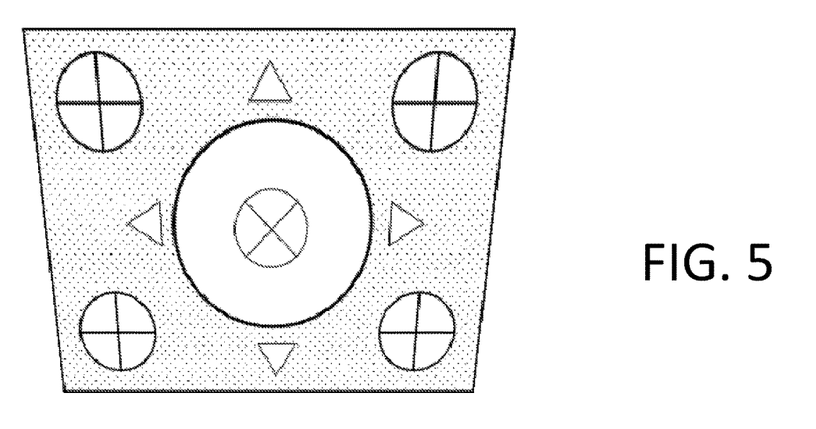
FIG. 5 depicts a test pattern with vertical keystone issues.
Figure 6:
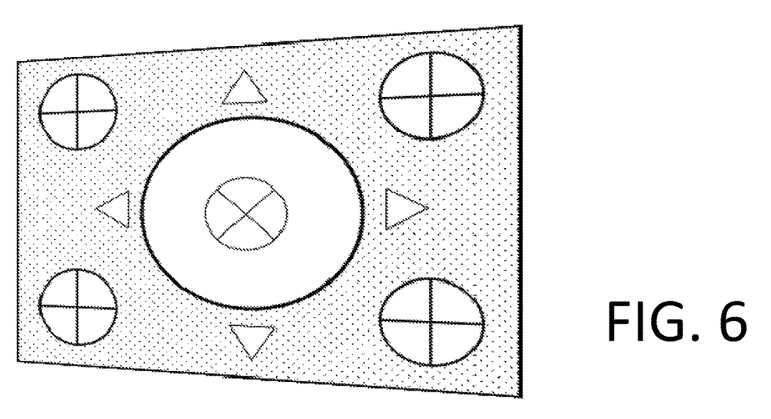
FIG. 6 depicts a test pattern with horizontal keystone issues.
Figure 7:
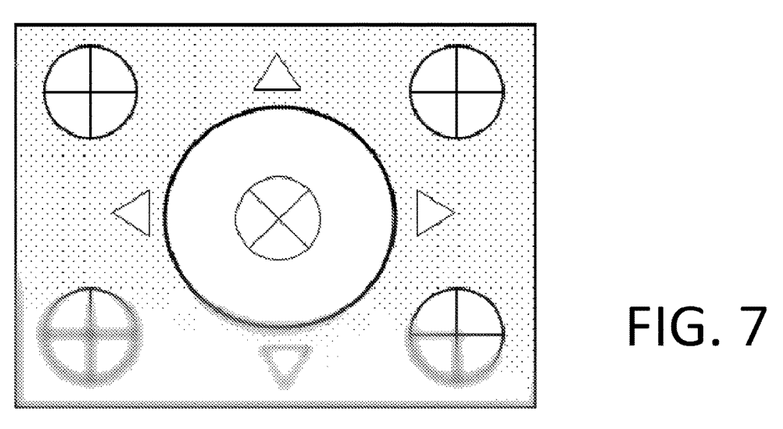
FIG. 7 depicts a test pattern with obliqueness issues.

Test pattern analysis 62 causes the projector to project a predefined test pattern 27 (FIG. 2), which can then be analyzed as image data captured by the camera 16. Image analysis may for example compare the captured test pattern image to the actual test pattern to discern whether the projected image is distorted and/or what type of distortion is present. For example, FIG. 4 depicts a normal test pattern image, FIG. 5 depicts the same image with a vertical keystone issue, FIG. 6 depicts the image with a horizontal keystone issue, and FIG. 7 depicts the image with an oblique focus problem. Any type of image comparison algorithm may be employed, e.g., mean square error, SURF (Speeded Up Robust Features), etc. In some cases, the distortion may be the result of the projector angle relative to the surface, while in other cases distortion results from issues with the surface itself.

Once the test pattern analysis 62 identifies a quality issue, one or more corrections can be implemented to address the issue. For instance, projection corrections 64 that alter the projector operations may be utilized to, e.g., implement an autofocus process, perform tilt/shift corrections, enhance contrast, etc. In cases of extreme obliqueness or if the screen is not perfectly vertical, a correction may be implemented to perform a tilt/shift to auto-correct focus all across the screen, iterating on image processing of the projected test pattern to maximize contrast at several key points on screen.

Lens step down 66 may be implemented as well in cases where the collected image from the camera indicates an uneven projection surface. In such cases the aperture on the projection lens can be "stopped down" to increase the f-stop and decrease the aperture. This generates additional depth of field to allow the projection of an image across uneven surfaces, while remaining in focus.

Image correction 68 that processes and digitally alters the actual video content being displayed may be employed for more severe issues. For example, in cases of an uneven surface, such as curling of a projection screen along the edges, a tilt-shift lens adjustment may not be enough to correct distortion. In this case, when the test pattern analysis 62 reads the projected test pattern, it discerns where the uneven surface exists after corrections have been made to maximize image consistency as described above. The projector then reconfigures the projected test pattern (compresses or expands areas of the image) to "straighten" the image across these areas. The projector saves this mesh, or filter. The mesh is then used to digitally process the video feed and project a resulting image that more closely conforms to the physical differences of the projection surface.

Periodic analysis 70 can be employed to detect and correct for environmental changes during a presentation. In one illustrative embodiment involving a static feed, such as a slide presentation, the system detects the start and finish of the content feed, and collects image data (e.g., takes a picture with the camera) periodically to detect if the projection surface or other quality aspects changed relative to the static image. Alternately, for moving video feeds, the system could inject a one-frame projection of the test pattern at various intervals that the camera could capture. The projector's image enhancement system can compare captured images to detect issues, such as movement of the external surface relative to the projector. An accelerometer within the projector could be used as well to detect such movement. When some change is detected, the image enhancement system could then take the proper corrective measure, e.g., (1) trigger an automatic correction by the projector, (2) prompt the user for interaction (i.e., warning light or sound), or (3) project an error message on the screen (i.e., "level the projector please"). In one further embodiment, the test pattern could be projected in a semi-transparent manner along with the actual content to minimize visual detection by viewers.

In troubleshooting mode 72, the projector projects additional visual cues over problematic areas in the projected surface. For example, a first color or pattern could be projected over surface areas that remain out of focus, a second color or pattern could be projected over areas with irregular textures, a third color or pattern could be projected over areas with a warped surface, etc. Further, another type of indicator, e.g., a flashing red line, could appear near a precipitous drop in surface area. These visual cues can help the operator maximize projection quality. Troubleshooting mode 72 may for example be used in cases where the image enhancement system cannot minimize blurring or distortion, and manual user intervention may be required.

Figure 8:
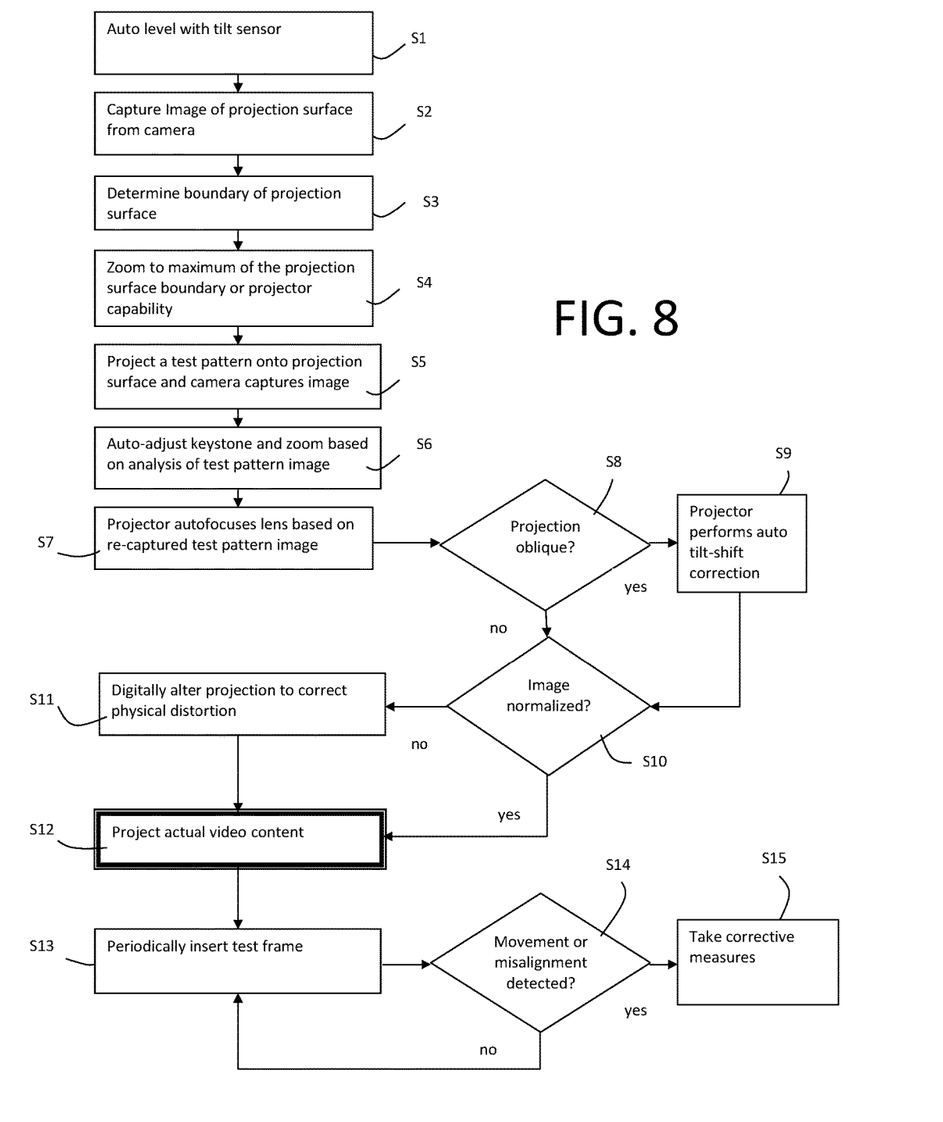
FIG. 8 depicts a flow diagram showing an illustrative method of implementing enhancements to a video projector in accordance with embodiments of the present invention.

FIG. 8 depicts a flow diagram of an illustrative process for implementing an image enhancement system for a video projector 10 (with reference to FIGS. 1 and 2). At S1, the projector 10 is auto-leveled with a tilt sensor, e.g., using existing techniques. At S2, an image of the projection surface 20 is obtained with a camera 16. The projection surface 20 may for example comprise a screen, a wall, etc. Next, the boundary of the projection surface 20 is determined based on the obtained surface image at S3. For instance, a screen may include a black border; a wall may include edges, corners, or color changes; etc. By analyzing where the surface changes color or other discontinuities, a boundary can be calculated. Once determined, the projector 10 zooms to the maximum of either (1) the projection surface (defined by the boundary) or (2) the projector capability at S4. For instance, the projector 28 may have a limit regarding projection dimensions at a given distance from the surface and thus be limited to something less than the boundary. The projector may also be redirected at a different angle to the surface based on a center point of the detected boundary. Initial adjustments based on the zoom/change of angle may be implemented at this time, e.g., tilt/shift and focus adjustments to head off keystone and out-of-focus issues, etc.

At S5, a test pattern is projected onto the projection surface 20 and the camera 16 captures an image of the test pattern. Based on an analysis of the test pattern image, additional corrections, such as keystone, contrast issues may be corrected using auto-adjust features of the projector at S6. Once complete, the test pattern image may be recaptured so that the lens can be auto focused to sharpen the image at S7.

At S8, the test pattern image is captured again and a determination is made whether the projected test pattern is oblique. If yes, then the projector 28 performs an auto tilt-shift correction at S9. If no (or if S9 is employed), then a determination is made whether any image distortion from the test pattern has been normalized at S10. If no, then the projection is digitally altered at S11 to correct physical distortions, e.g., using filtering. If the image is normalized at S10 or corrected at S11, the actual video content intended for presentation is projected at S12.

At S13, a test frame having a test pattern can be periodically inserted into the presentation content, and a check at S14 can be made by evaluating captured images of the test frames to determine if any movement, misalignment or other quality issues exist at S14. If no, the process periodically repeats at S13. If yes, corrective measures are taken at S15. Corrective measures may include issuing a warning, or performing one or more of the processes described herein.

As will be appreciated by one skilled in the art, aspects of the present invention may be embodied as a system, method or computer program product. Accordingly, aspects of the present invention may be employed with a computerized process that takes the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer readable medium(s) having computer readable program code embodied thereon.

Any combination of one or more computer readable medium(s) may be utilized. The computer readable medium comprises a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Alternatively, the program product could be embodied on computer readable signal medium which may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer system 40 of FIG. 2 may comprise any type of computing device and is shown including a one or more of processors 42, memory 46, an input/output (I/O) 44 (e.g., one or more I/O interfaces and/or devices), and a communications pathway 47. In general, processor(s) 42 execute program code, such as image enhancement system 30, which is at least partially fixed in memory 46. While executing program code, processor(s) 42 can process data, which can result in reading and/or writing transformed data from/to memory 46 and/or I/O 44 for further processing. Pathway 47 provides a communications link between each of the components in computer system 40. I/O 44 can comprise one or more human I/O devices, which enable a user to interact with computer system 40. To this extent, image enhancement system 30 can manage a set of interfaces (e.g., graphical user interface(s), application program interface, and/or the like) that enable human and/or system users to interact with the image enhancement system 30. Further, image enhancement system 30 can manage (e.g., store, retrieve, create, manipulate, organize, present, etc.) data, such as image data 24, using any solution.

In any event, computer system 40 can comprise one or more general purpose computing articles of manufacture (e.g., computing devices) capable of executing program code. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, image enhancement system 30 can be embodied as any combination of system software and/or application software.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A video projector, comprising:
   a projection system for projecting video content onto a surface;
   a camera for capturing image data from the surface;
   an analysis system for analyzing captured image data;
   a correction system for enhancing the video content being projected onto the surface based on the analysis of the captured image data; and
   a system for causing a visual cue to be projected on the surface in response to a detected problematic area associated with the surface requiring manual intervention.

2. The video projector of claim 1, wherein the projection system includes a control system for projecting a test pattern onto the surface that can be captured as a test pattern image by the camera.

3. The video projector of claim 2, wherein the correction system corrects keystone issues based on an analysis of the test pattern image.

4. The video projector of claim 2, wherein the correction system corrects obliqueness issues based on an analysis of the test pattern image.

5. The video projector of claim 1, wherein the correction system causes at least one of: an autofocus correction, a tilt/shift correction, a contrast enhancement, a lens step down, an image correction using a digital filter, an alert to be generated and a visual cue to be projected.

6. The video projector of claim 1, wherein the analysis system determines a boundary of the surface based on the captured image data.

7. The video projector of claim 1, wherein the analysis system analyzes image data captured from a plurality of video frames periodically inserted into the projected video content.

8. A program product stored on a non-transitory computer readable storage medium, which when executed by a computer system, enhances video content projected by a video projector onto a surface, and comprises:
program code for causing a test pattern to be projected by the video projector, wherein the test pattern is projected in a semi-transparent manner along with the video content;
program code for capturing a test pattern image using a camera directed at the surface;
program code for analyzing the test pattern image; and
program code for enhancing the video content being projected onto the surface based on the analysis of the test pattern image.

9. The program product of claim 8, wherein the program code for analyzing compares a captured test pattern image with the test pattern.

10. The program product of claim 9, wherein the program code for enhancing the video content corrects keystone issues.

11. The program product of claim 9, wherein the program code for enhancing the video content corrects obliqueness issues.

12. The program product of claim 8, wherein the program code for enhancing the video content causes at least one of: an autofocus correction, a tilt/shift correction, a contrast enhancement, a lens stop down, an image correction using a digital filter, an alert to be generated and a visual cue to be projected.

13. The program product of claim 8, further comprising program code that determines a boundary of the surface based on captured image data.

14. The program product of claim 8, further comprising program code that inserts video frames into the projected video content and inputs captured image data of the inserted frames for periodic analysis.

15. A method for enhancing video content being projected by a video projector onto a surface, comprising:
projecting a test pattern onto the surface using the video projector;
capturing a test pattern image using a camera directed at the surface;
analyzing the test pattern image, wherein the analyzing injects test pattern frames at various intervals into a moving video feed and analyzes captured test patterns from a resulting projected moving video; and
enhancing the video content being projected onto the surface based on the analysis of the test pattern image.

16. The method of claim 15, wherein analyzing the test pattern image include comparing the test pattern image to the test pattern to identify an image quality issue.

17. The method of claim 16, wherein enhancing the video content corrects one of a keystone issue and an obliqueness issue.

18. The method of claim 15, wherein enhancing the video content causes at least one of: an autofocus correction, a tilt/shift correction, a contrast enhancement, a lens step down, an image correction using a digital filter, an alert to be generated and a visual cue to be projected.

19. The method of claim 15, further comprising:
capturing an image of the surface; and
determining a boundary of the surface based on the captured image.

20. The method of claim 15, further comprising:
inserting video frames into the projected video content;
using the camera to capture images of the inserted video frames; and
analyzing the inserted frames to provide a periodic analysis.

* * * * *